United States Patent [19]
Heiberger et al.

[11] Patent Number: 5,341,489
[45] Date of Patent: Aug. 23, 1994

[54] MEMORY CARD WITH PROGRAMMABLE INTERLEAVING

[75] Inventors: James F. Heiberger; David A. Smith, both of Rochester, N.Y.

[73] Assignee: Eastman Kodak Company, Rochester, N.Y.

[21] Appl. No.: 868,163

[22] Filed: Apr. 14, 1992

[51] Int. Cl.$^5$ ............................................. G06F 12/02
[52] U.S. Cl. .................... 395/425; 395/400; 365/900; 348/231
[58] Field of Search ............... 395/400, 425; 358/209, 358/909; 365/900

[56] References Cited

U.S. PATENT DOCUMENTS

| | | | |
|---|---|---|---|
| 4,553,252 | 11/1985 | Egendorf | 377/15 |
| 4,607,347 | 8/1986 | Kummer et al. | 395/800 |
| 4,803,554 | 2/1989 | Pape | 358/209 |
| 4,837,628 | 6/1989 | Sasaki | 358/209 |
| 4,887,161 | 12/1989 | Watanabe et al. | 358/224 |
| 4,887,234 | 12/1989 | Iijima | 395/425 |
| 4,910,393 | 3/1990 | Gercekci et al. | 235/380 |
| 5,016,107 | 5/1991 | Sasson et al. | 358/209 |
| 5,018,017 | 5/1991 | Sasaki et al. | 358/209 |
| 5,027,214 | 6/1991 | Fujimori | 358/209 |
| 5,032,927 | 7/1991 | Watanabe et al. | 358/335 |
| 5,034,804 | 7/1991 | Sakaki et al. | 358/41 |

OTHER PUBLICATIONS

Personal Computer Memory Card International Association (PCMCIA), Excerpts from *PC Card Standard*, Release 2.0, Sep. 1991.

U.S. Patent Application, Ser. No. 844,855, entitled Flash EPPOM Memory Card for Electronic Camera. Inventor: Noel L. Reyner; Filed Mar. 3, 1992.

*Primary Examiner*—David L. Robertson

[57] ABSTRACT

A memory card that is detachably connectable to a host data processing system includes a plurality of flash EPROM memory devices for storing data input from the host system in addressable data locations in the memory devices. The card also includes a control circuit having further memory for storing an interleave factor input from the host system for specifying the order in which data is consecutively distributed among the memory devices. By selectively steering certain low order address bits to a chip select decoder, data is serially distributed into identical address locations in each memory device. By having the interleave factor variable, data may be distributed among a selected set of memory devices, thereby allowing the host system to relate the data transfer rate to the particular application.

21 Claims, 16 Drawing Sheets

MEMORY MAP

EXAMPLE 1: BYTE MODE; X = 1; INTERLEAVE FACTOR = 1X = 1. (DATA STORAGE)

| | ADDR | ADDR | |
|---|---|---|---|
| 1 | 0000 DATA 1 BYTE 1<br>0001 DATA 1 BYTE 2<br>0002 DATA 1 BYTE 3 | | 9 |
| 2 | XXX0 DATA 1 BYTE XXX1<br>XXX1 DATA 1 BYTE XXX2<br>XXX2 DATA 1 BYTE XXX3 | | 10 |
| 3 | | | 11 |
| 4 | YYY0 DATA XX BYTE YYYY | | 12 |
| 5 | | | 13 |
| 6 | | | 14 |
| 7 | | | 15 |
| 8 | | | 16 |

FIG. 5

MEMORY MAP

EXAMPLE 2: BYTE MODE; X = 1; INTERLEAVE FACTOR = 8X = 8 (IMAGE DATA)

| | ADDR | ADDR | |
|---|---|---|---|
| 1 | 0000-IMAGE 1/BYTE 1<br>0001-IMAGE 1/BYTE 9<br>¦<br>XXX0-IMAGE 2/BYTE 1<br>XXX1-IMAGE 2/BYTE 9<br>XXX2-IMAGE 2/BYTE 17 | 0000-IMAGE X/BYTE 1<br>0001-IMAGE X/BYTE 9 | 9 |
| 2 | 0000-IMAGE 1/BYTE 2<br>0001-IMAGE 1/BYTE 10<br>¦<br>XXX0-IMAGE 2/BYTE 2<br>XXX1-IMAGE 2/BYTE 10 | 0000-IMAGE X/BYTE 2<br>0001-IMAGE X/BYTE 10 | 10 |
| 3 | 0000-IMAGE 1/BYTE 3<br>0001-IMAGE 1/BYTE 11<br>¦<br>XXX0-IMAGE 2/BYTE 3<br>XXX1-IMAGE 2/BYTE 11 | 0000-IMAGE X/BYTE 3<br>0001-IMAGE X/BYTE 11 | 11 |
| 4 | 0000-IMAGE 1/BYTE 4<br>0001-IMAGE 1/BYTE 12<br>BANK 1<br>XXX0-IMAGE 2/BYTE 4<br>XXX1-IMAGE 2/BYTE 12 | 0000-IMAGE X/BYTE 4<br>0001-IMAGE X/BYTE 12<br>BANK 2 | 12 |
| 5 | 0000-IMAGE 1/BYTE 5<br>0001-IMAGE 1/BYTE 13<br>¦<br>XXX0-IMAGE 2/BYTE 5<br>XXX1-IMAGE 2/BYTE 13 | 0000-IMAGE X/BYTE 5<br>0001-IMAGE X/BYTE 13 | 13 |
| 6 | 0000-IMAGE 1/BYTE 6<br>0001-IMAGE 1/BYTE 14<br>¦<br>XXX0-IMAGE 2/BYTE 6<br>XXX1-IMAGE 2/BYTE 14 | 0000-IMAGE X/BYTE 6<br>0001-IMAGE X/BYTE 14 | 14 |
| 7 | 0000-IMAGE 1/BYTE 7<br>0001-IMAGE 1/BYTE 15<br>¦<br>XXX0-IMAGE 2/BYTE 7<br>XXX1-IMAGE 2/BYTE 15 | 0000-IMAGE X/BYTE 7<br>0001-IMAGE X/BYTE 15 | 15 |
| 8 | 0000-IMAGE 1/BYTE 8<br>0001-IMAGE 1/BYTE 16<br>¦<br>XXX0-IMAGE 2/BYTE 8<br>XXX1-IMAGE 2/BYTE 16 | 0000-IMAGE X/BYTE 8<br>0001-IMAGE X/BYTE 16 | 16 |

MEMORY MAP
EXAMPLE 3: BYTE MODE; X = 4; INTERLEAVE FACTOR = 8X = 32 (IMAGE DATA)

| | ADDR(A) | ADDR(B) | ADDR(C) | ADDR(D) | ADDR(A) | ADDR(B) | ADDR(C) | ADDR(D) | |
|---|---|---|---|---|---|---|---|---|---|
| 1 | 0000 IM1 B1<br>0001 IM1 B33 | 0000 IM1 B2<br>0001 IM1 B34 | 0000 IM1 B3 | 0000 IM1 B4 | 0001 IM1 B1<br>0001 IM1 B33 | 0000 IM1 B2<br>0001 IM1 B34 | 0000 IM1 B3 | 0000 IM1 B4 | 9 |
| 2 | XXX0 IM2 B1 | XXX0 IM2 B2 | XXX0 IM2 B3 | XXX0 IM2 B4 | 0000 IM1 B5 | 0000 IM1 B6 | 0000 IM1 B7 | 0000 IM1 B8 | 10 |
| 3 | 0000 IM1 B5 | 0000 IM1 B6 | 0000 IM1 B7 | 0000 IM1 B8 | | | IMX | IMX | 11 |
| 4 | XXX0 IM2 B5 | XXX0 IM2 B6 | XXX0 IM2 B7 | XXX0 IM2 B8 | | | IMX | IMX | 12 |
| 5 | 0000 IM1 B9 | | IM1 | IM1 | | | IMX | IMX | 13 |
| 6 | XXX0 IM2 B9 | | IM2 | IM2 | | | IMX | IMX | 14 |
| 7 | | | IM1 | IM1 | | | IMX | IMX | 15 |
| 8 | | | IM2 | IM2 | | | IMX | IMX | 16 |

MEMORY MAP
EXAMPLE 4: WORD MODE; X = 4; INTERLEAVE FACTOR = 8X = 32 (IMAGE DATA)

| | ADDR(A) | ADDR(B) | ADDR(C) | ADDR(D) | ADDR(A) | ADDR(B) | ADDR(C) | ADDR(D) | |
|---|---|---|---|---|---|---|---|---|---|
| 1 | 0000 IM1 W1 B1<br>0001 IM1 W33 B1<br>XXX0 IM2 W1 B1 | 0000 IM1 W2 B1 | 0000 IM1 W3 B1 | 0000 IM1 W4 B1 | 0000 IM1 W1 B2<br>0001 IM1 W33 B2<br>XXX0 IM2 W1 B2 | 0000 IM1 W2 B2 | 0000 IM1 W3 B2 | 0000 IM1 W4 B2 | 9 |
| 2 | 0000 IM1 W5 B1 | 0000 IM1 W6 B1 | 0000 IM1 W7 B1 | 0000 IM1 W8 B1 | 0000 IM1 W5 B2 | 0000 IM1 W6 B2 | 0000 IM1 W7 B2 | 0000 IM1 W8 B2 | 10 |
| 3 | 0000 IM1 W9 B1 | IM1<br>IM2 | IM1<br>IM2 | IM1<br>IM2 | | IM1<br>IM2 | IM1<br>IM2 | IM1<br>IM2 | 11 |
| 4 | | IM1<br>IM2 | IM1<br>IM2 | IM1<br>IM2 | | IM1<br>IM2 | IM1<br>IM2 | IM1<br>IM2 | 12 |
| 5 | | IM1<br>IM2 | IM1<br>IM2 | IM1<br>IM2 | | IM1<br>IM2 | IM1<br>IM2 | IM1<br>IM2 | 13 |
| 6 | | IM1<br>IM2 | IM1<br>IM2 | IM1<br>IM2 | | IM1<br>IM2 | IM1<br>IM2 | IM1<br>IM2 | 14 |
| 7 | | IM1<br>IM2 | IM1<br>IM2 | IM1<br>IM2 | | IM1<br>IM2 | IM1<br>IM2 | IM1<br>IM2 | 15 |
| 8 | | IM1<br>IM2 | IM1<br>IM2 | IM1<br>IM2 | | IM1<br>IM2 | IM1<br>IM2 | IM1<br>IM2 | 16 |

FIG. 12

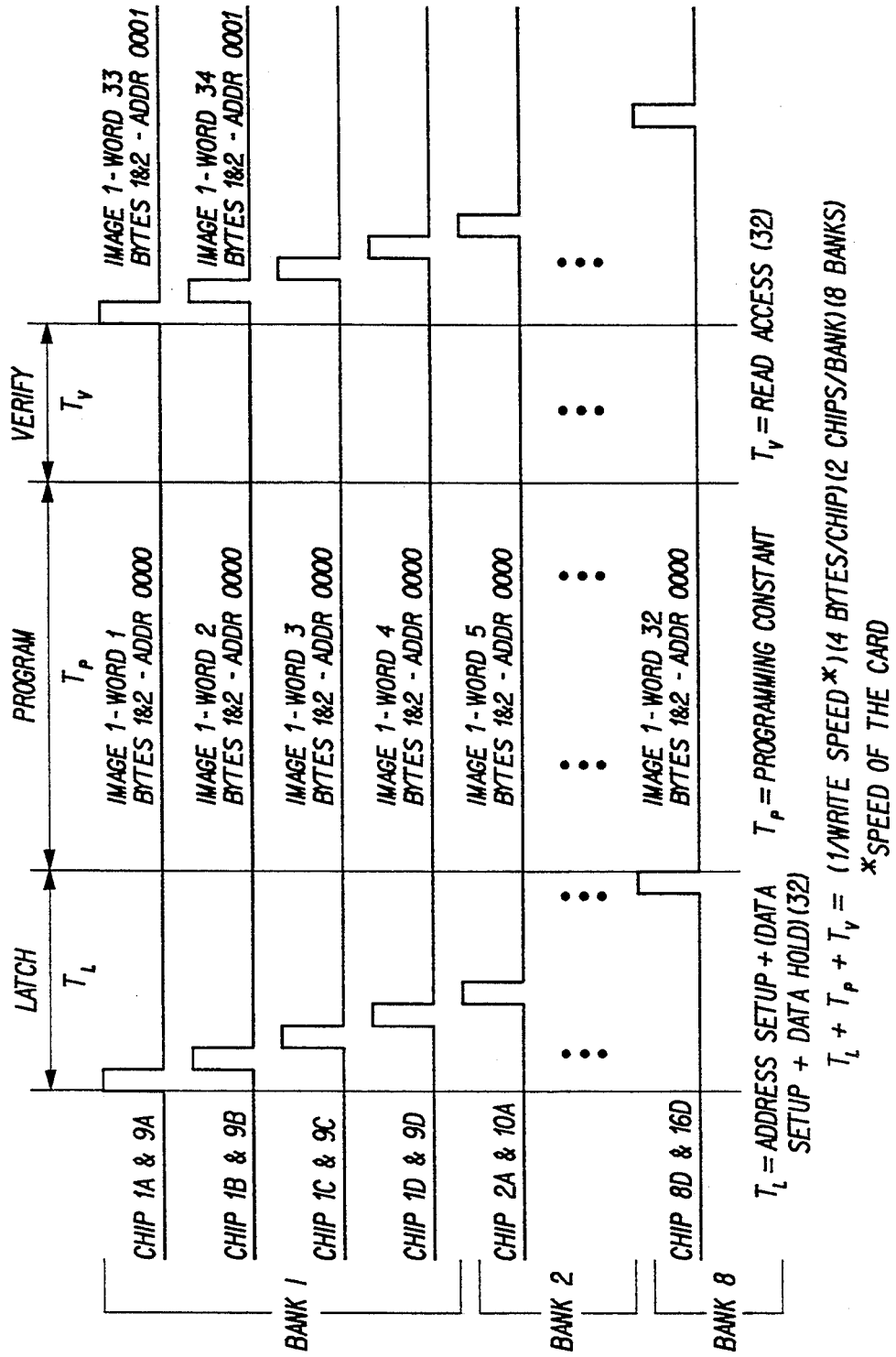

MEMORY MAP

EXAMPLE 5: BYTE MODE; X = 1; INTERLEAVE FACTOR = 4X = 4 (IMAGE STORAGE)

| | ADDR | | ADDR | |
|---|---|---|---|---|
| 1 | 0000-IMAGE 1/BYTE 1<br>0001-IMAGE 1/BYTE 5<br><br>XXX0-IMAGE 2/BYTE 1<br>XXX1-IMAGE 2/BYTE 5 | | | 9 |
| 2 | 0000-IMAGE 1/BYTE 2<br>0001-IMAGE 1/BYTE 6<br><br>XXX0-IMAGE 2/BYTE 2<br>XXX1-IMAGE 2/BYTE 6 | | | 10 |
| 3 | 0000-IMAGE 1/BYTE 3<br>0001-IMAGE 1/BYTE 7<br><br>XXX0-IMAGE 2/BYTE 3<br>XXX1-IMAGE 2/BYTE 7 | BANK 1 | BANK 3 | 11 |
| 4 | 0000-IMAGE 1/BYTE 4<br>0001-IMAGE 1/BYTE 8<br><br>XXX0-IMAGE 2/BYTE 4<br>XXX1-IMAGE 2/BYTE 8 | | | 12 |
| 5 | 0000-IMAGE X/BYTE 1<br>0001-IMAGE X/BYTE 5 | | | 13 |
| 6 | 0000-IMAGE X/BYTE 2<br>0001-IMAGE X/BYTE 6 | BANK 2 | BANK 4 | 14 |
| 7 | 0000-IMAGE X/BYTE 3<br>0001-IMAGE X/BYTE 7 | | | 15 |
| 8 | 0000-IMAGE X/BYTE 4<br>0001-IMAGE X/BYTE 8 | | | 16 |

FIG. 14

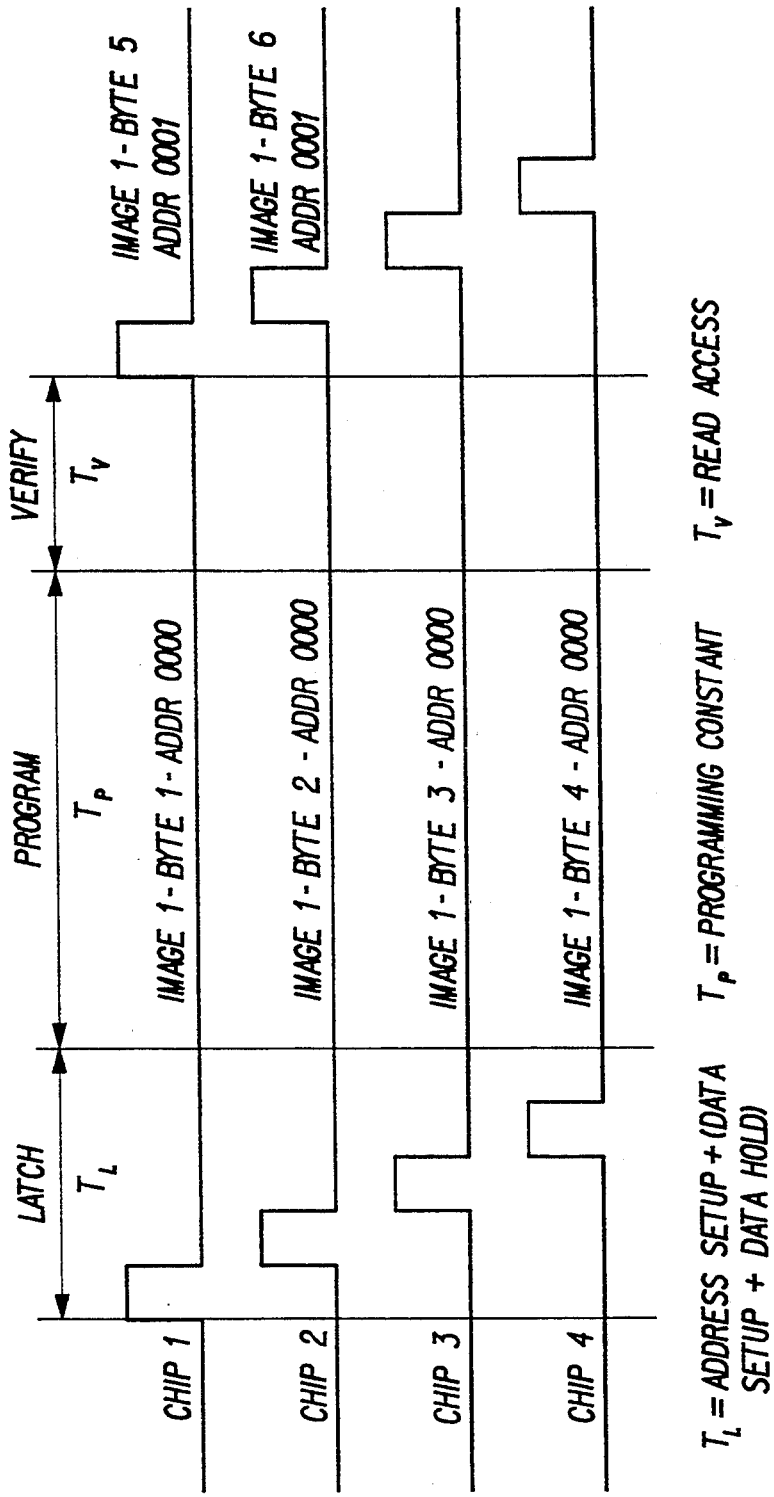

MEMORY CARD WITH PROGRAMMABLE INTERLEAVING

FIELD OF INVENTION

This invention pertains to apparatus for storing data in a plurality of separately addressable memory devices, and, in particular, to a memory card containing a plurality of programmable flash EPROM memory devices.

BACKGROUND

It is known to provide detachable integrated circuit memory in the size and form of a thin card, much like a credit card, that is connectable to a memory port of a host data processing system. A typical general-purpose host system, such as a desktop computer, incorporates a processor for utilizing data recorded on the memory card in a variety of applications; a typical specialized host system, e.g., an image capture processing system, provides large volumes of digital data for rapid recording on the card. An example of the latter host system is shown in U.S. Pat. No. 5,016,107, wherein an image sensor generates analog image information that is converted into digital signals, transformed, and encoded into a compressed stream of digital signals that are down-loaded to a removable memory card. The memory card disclosed therein includes a commercially-available high speed static random access memory (SRAM).

Memory cards are also available that include a plurality of non-volatile, electronically programmable read only memory (EPROM) devices. Flash EPROM devices, in particular, are desirable because, unlike SRAM, they are inherently non-volatile and less in cost, size, and complexity. Present flash EPROM personal computer memory cards are designed to substitute for floppy or hard disk drives and, for this purpose, are configured to write and read data files with the same usage and timing as such drives. While the writing speed of flash EPROM technology is faster than floppy or hard drives, it is much slower than the write speed of SRAM and DRAM technology. This ordinarily poses little problem for a personal computer, since the card is replacing the floppy or hard drive and, thus, is not normally intended for applications having more demanding data rates. In such cases, data is simply written seriatim into one memory location after another, until a memory device is filled, then on to the next device; data corresponding to a single event, e.g., an image, is series-linked, or concatenated, in the corresponding memory map. When the host system is an electronic camera, however, the large amount of data generated by high resolution imaging requires a correspondingly high write rate for reasonable image capture speeds.

To avoid turning to DRAM or SRAM technology for high data transfer rates, two approaches to improving the write rate of EPROM cards have been suggested. In U.S. Pat. No. 4,803,554, "Electronic Imaging Camera Utilizing EPROM Memory", issued to Pape on Feb. 7, 1989, an electronic camera includes an EPROM module having sixteen EPROM devices arranged in four groups. A set of four discrete latches are used to latch four successive image data bytes as they are generated by a signal processing circuit. The data bytes are then simultaneously transferred from the latches to the four EPROMS of a selected group. This allows loading each EPROM in the selected group in unison, thereby achieving a 4 to 1 reduction in data transfer time. Successive data bytes are then loaded in a similar manner until all of the data for a given image is loaded within the selected group of four EPROMS; then, the next group of four EPROMS is similarly loaded with the next image, and so on. Another approach is illustrated by Ser. No. 844,855, "Flash EPROM Memory Card for Electronic Camera", filed in the name of N. Reyner on Mar. 3, 1992 and assigned to the same assignee as the present application. Predicated on the fact that the latching cycle of a flash EPROM is much shorter than the programming cycle, this approach shows the interleaving of successive data words between all memory banks on a memory card, such that the full capacity of the memory devices are employed. This has the advantage of allowing a write (program) operation to be initiated in a second memory bank on new data before a write (program) operation is completed in a first memory bank on the preceding data, and so on across all the memory devices in the card.

Notwithstanding these advantages as to writing time for high density data files, it remains desirable to serially load data into each flash EPROM memory element, one at a time, instead of interleaving data among plural flash EPROM memory elements. This is because the erase block for a flash EPROM memory card is usually each flash EPROM memory device (or a relatively large subdivision thereof), meaning that all storage locations of the block of a memory device are erased at once. Consequently, the higher write speed obtained by interleaving has the attendant disadvantage that data pertaining to one event, e.g., an image, is spread across many memory devices. To erase that image then requires that each block of every flash EPROM memory element into which the data is interleaved must be erased, i.e., the effective "erase block" has been significantly increased compared with the case of concatenated storage.

SUMMARY OF THE INVENTION

The invention is based on the recognition that regular computer files may not require interleaving because the higher speed is unnecessary, thus retaining the attendant erase advantage, while other data files, such as high resolution files for images, require the speed and thus the benefit of interleaving. The solution to these dissimilar conditions lies in providing means to program a standard flash EPROM memory card to function as a storage device for either regular speed data files or high speed data files, as well as files of intervening speed. An on-card circuit would contain additional non-volatile EPROM memory that would be programmable via the standard card interface to provide different levels of interleaving varying from one (normal data files) to a maximum value dependent upon the number of memory elements on the card.

Generally, the invention provides data storage apparatus, such as a memory card, for use with a host data processing system. The data storage apparatus includes: 1) memory means, divided into a plurality of memory devices, for storing data in addressable data locations; 2) memory interleave means, responsive to a control factor input from the host system, for specifying the order by which data locations are addressed among successive memory devices; and 3) circuit means responsive to the memory interleave means and to an address input from the host system for accessing data locations among the memory devices according to the order specified by the control factor. In a preferred implementation, the memory devices are flash EPROM devices in which data is latched in sequence and then programmed in tandem to obtain a faster data transfer rate.

BRIEF DESCRIPTION OF THE DRAWINGS

The invention will be described in relation to the drawings, wherein:

FIG. 5 is a diagram of the memory map of the memory card for an interleave factor of one;

FIG. 7 is a diagram of the memory map of the memory card for an interleave factor of eight;

FIG. 9 is a diagram of the memory map of a memory card that is programmed to latch four bytes of image data into each memory chip (byte mode) for an interleave factor of eight;

FIG. 12 is a diagram of the memory map of a memory card that is programmed to latch four bytes of image data, two memory chips at a time (word mode), for an interleave factor of eight;

FIG. 13 illustrates the write timing sequence for producing the memory map of FIG. 12;

FIG. 14 is a diagram of the memory map of the memory card for an interleave factor of four; and FIG. 15 illustrates the write timing sequence for producing the memory map of FIG. 14.

DETAILED DESCRIPTION

Figure 1:
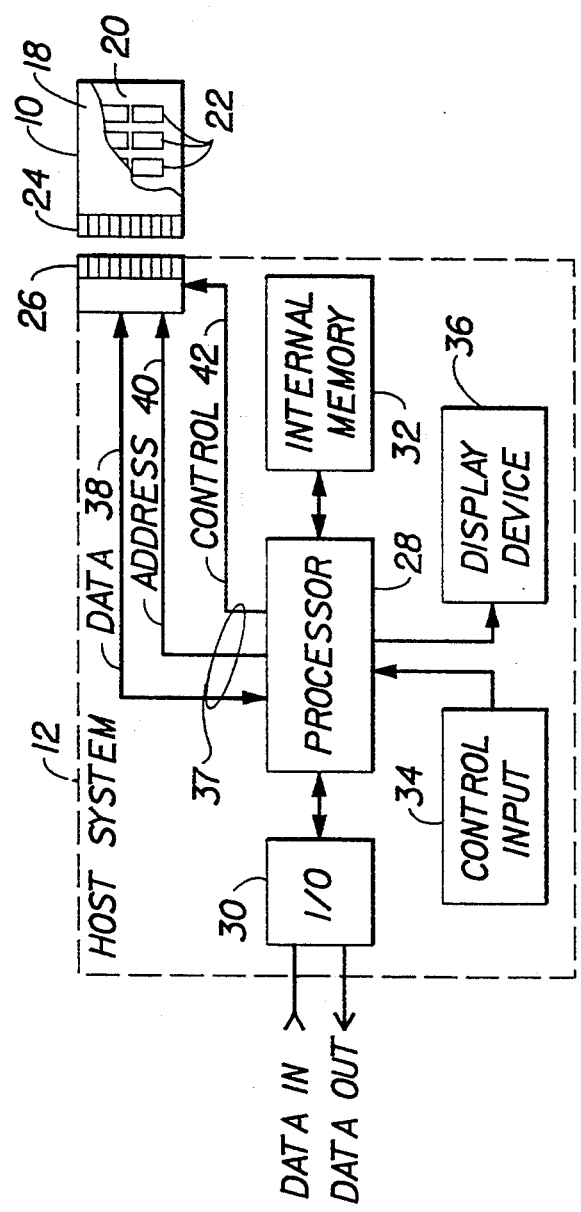
FIG. 1 is a generalized block diagram of a host processing system that receives a memory card capable of programmable interleaving in accordance with the invention.
Figure 3:
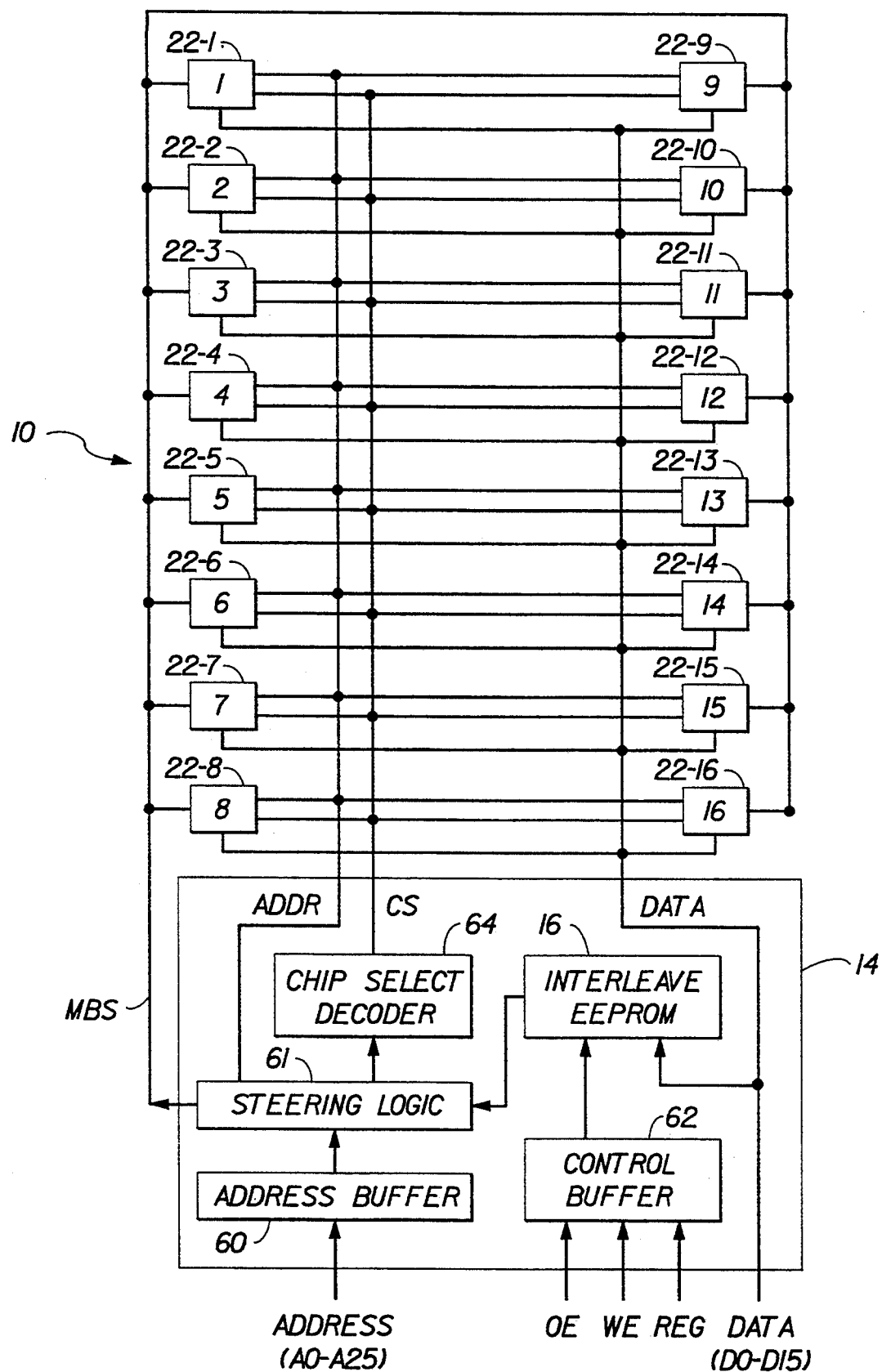
FIG. 3 shows the architecture of a memory card capable of programmable interleaving in accordance with the invention.

Referring initially to FIGS. 1 and 3, the invention pertains to a flash EPROM memory card 10 that is programmable from a host system 12 to function as a storage device for either regular data files, such as used in ordinary applications of a desktop computer, or high-speed data files, such as would be needed for image storage. More specifically, the memory card 10 includes an application-specific integrated circuit (ASIC) 14 having a non-volatile EEPROM memory 16 that is programmable via a standard card interface for various levels of interleaving. As shown in FIG. 1, the memory card includes a card-like enclosure 18 that is partially broken away to show a circuit board 20 having a plurality of nonvolatile memory devices 22, preferably flash EPROM devices, and an edge connector 24 mounted toward one end of the card 10. The edge connector 24 is configured to mate with a corresponding connector 26 when the memory card 10 is properly located in relation to the host system 12.

The host system 12, shown in FIG. 1, is representative of a generic processing system useful for a variety of purposes, and is shown only in a most general sense. The host system 12 includes a programmed processor 28 for accessing data (data in and data out) through an I/O interface 30 and for writing data to and retrieving data from the memory card 10. The processor 28 operates upon the data in accordance with programs stored in an internal memory 32 and instructions input through a control input device 34, such as a keyboard. The operations performed by the processor 28 are monitored through a display device 36, such as a liquid crystal display (LCD) device or a cathode ray tube (CRT) display, that is connected to the processor 28. The interface between the processor 28 and the memory card 10 includes a communication bus 37, depicted as having an interface connection 38 for data, a connection 40 for addresses, and a connection 42 for control data. The host system 12 may be a personal computer for which the memory card 10 is configured similar to a floppy or hard disk drive; in that case the speed of data movement and storage is not a high priority. In other cases, the host system 12 may be, for example, rapidly processing volumes of data, for real-time application, and an intermediate rate of data movement is needed. In some cases, such as high resolution image capture, the host system 12 must process and write data very rapidly to the memory card 10 if any semblance of real-time capture is to be maintained.

Figure 2:
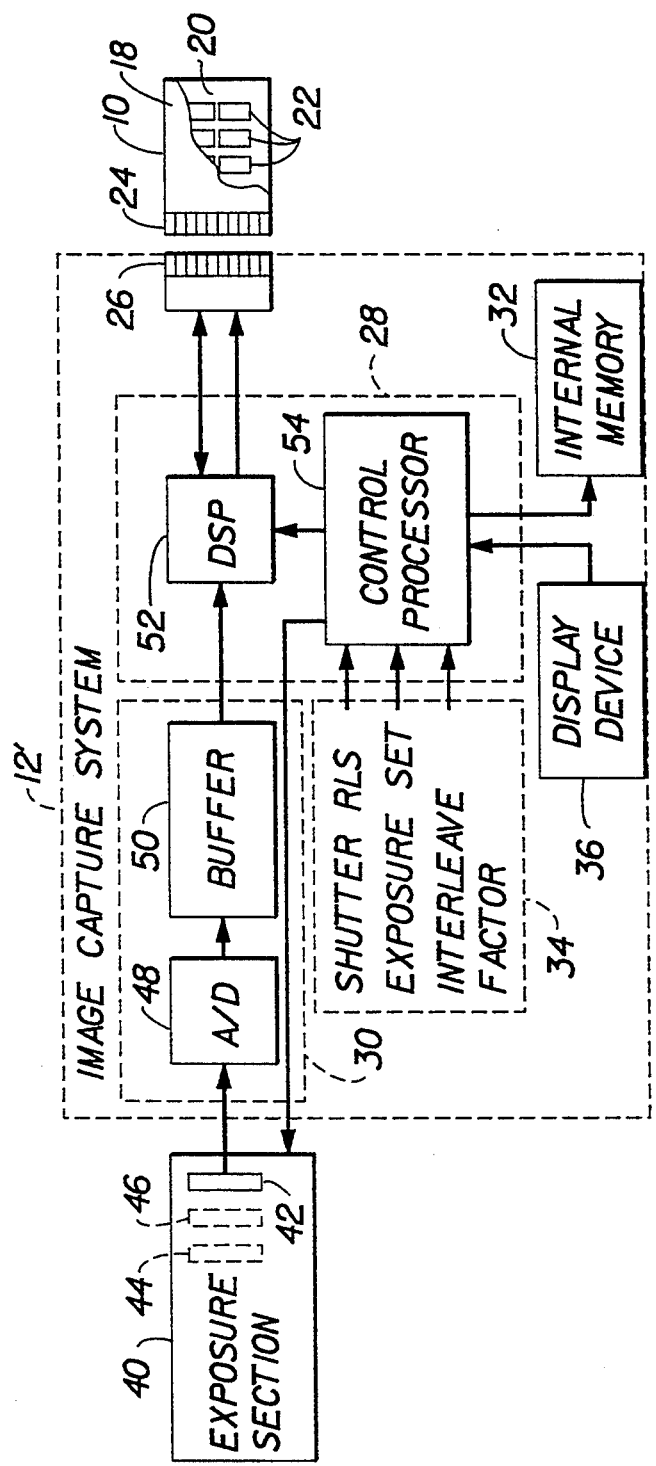
FIG. 2 is a block diagram of a system as described in FIG. 1 having particular utility for image capture.

FIG. 2 is an example of a host system that is dedicated to image capture. The resulting image capture system 12' includes the aforementioned I/O interface 30, the processor 28, the internal memory 32, the control input device 34, and the display device 36. The system 12' accesses image data from an exposure section 40, which directs light from a subject (not shown) toward an image sensor 42. Although not shown in detail, the exposure section 40 includes conventional optics for directing the image light through a diaphragm 44, which regulates the optical aperture, and a shutter 46, which regulates exposure time. The sensor 42, which includes a two-dimensional array of photosites corresponding to picture elements of the image, may be a conventional charge-coupled device (CCD) using either well-known interline transfer or frame transfer techniques. The analog image signals generated by the sensor 42 are applied to an A/D converter 48 (in the I/O interface 30), which generates a digital image signal from the analog input signal for each picture element.

The digital signals are applied to an image buffer 50, which is a random access memory (RAM) with storage capacity for a plurality of still images. The processing of the digital signals is performed by a digital signal processor 52, which may, for example, apply a compression algorithm to the digital signals. A control processor 54 generally controls the input section 40 of the system 12' by initiating and controlling exposure (by operation of the diaphragm 44 and shutter 46), by generating the horizontal and vertical clocks needed for driving the sensor 42 and for clocking image data therefrom. The control processor 54 also receives exposure settings and the storage interleave factor from the user through the control input device 34. Operational conditions are shown on the display device 36. Once a certain number of digital image signals have accumulated in the buffer 50, the stored signals are applied to the digital processor 52, which controls the throughput processing rate of the compression and write operations of the camera. An image capture system of this type is further described in the aforementioned U.S. Pat. No. 5,016,107, "Electronic Still Camera Utilizing Image Compression and Digital Storage," which is incorporated herein by reference.

The architecture of the memory card 10 is shown in FIG. 3. Sixteen flash EPROM memory devices 22-1 to 22-16 are interconnected to the integrated circuit 14, which receives a twenty-six bit address signal (ADDR), a sixteen bit data signal (DATA), an output enable (OE) signal, a write enable (WE) signal, and an attribute memory select (REG) signal. (The typical memory card receives other inputs, but the foregoing signals are sufficient for an explanation of the invention). The address signal (ADDR) is stored in an address buffer 60 and supplied therefrom to steering logic 61, while the output enable (OE) signal, the write enable (WE) signal, and the attribute memory select (REG) signal are stored in a control buffer 62. To set the interleave factor, control information present on the DATA input line is input to the interleave EEPROM 16 when the attribute memory select (REG) signal is enabled. When the attribute memory select (REG) signal is not enabled, data present on the DATA input lines is latched to the designated memory devices. Certain low order address bits are presented to a chip select decoder circuit 64 for generating a chip select (CS) signal. In the byte mode and/or word mode of operation, a multi-byte select (MBS) signal is produced by the interleave EEPROM and used to select a subset of the memory devices 22-1 to 22-16 for multi-byte or word storage.

Figure 6:
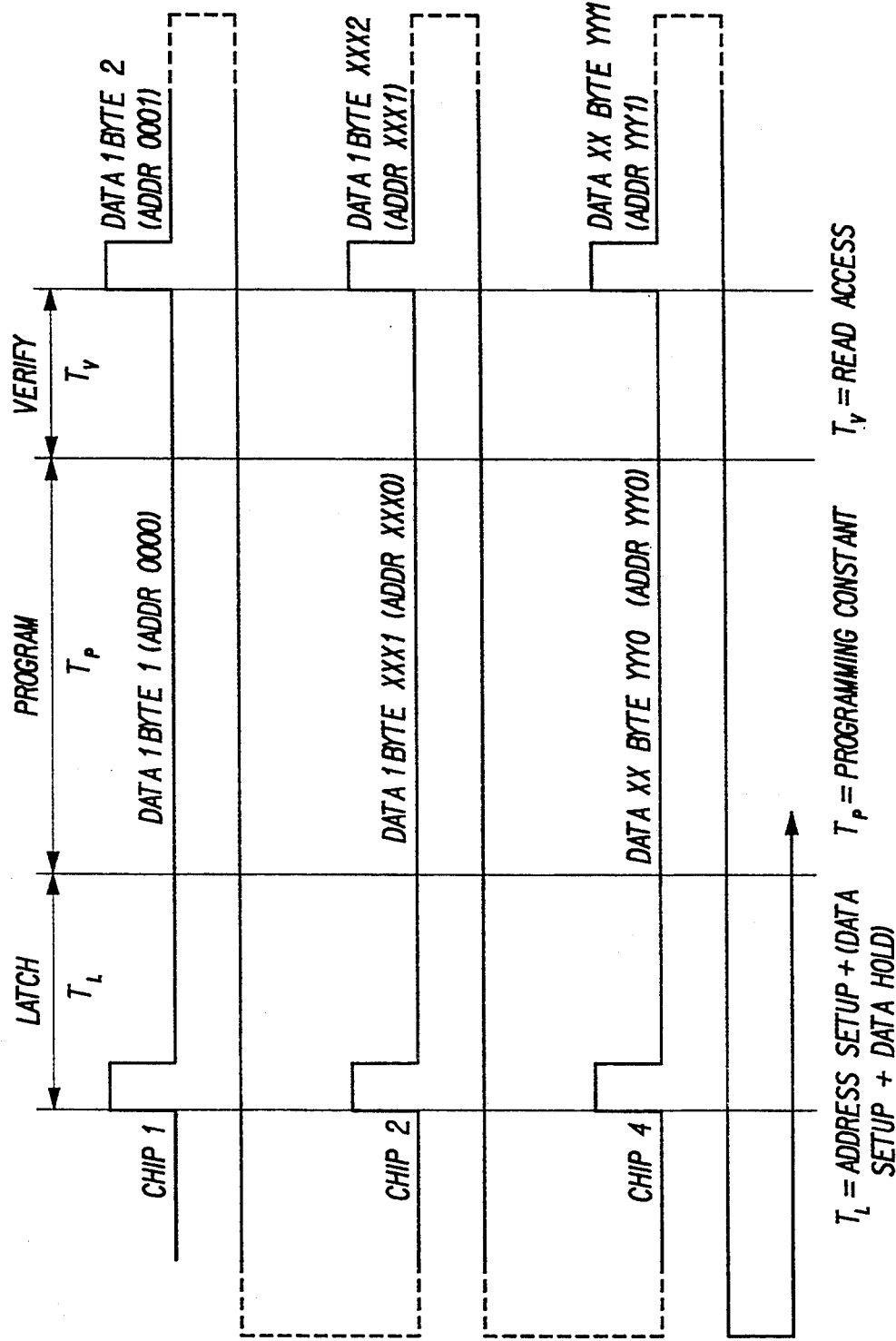
FIG. 6 illustrates the write timing sequence for producing the memory map of FIG. 5.

Each flash EPROM memory device 22-1 to 22-16 has, as best shown in the write timing example of FIG. 6, a write timing cycle composed of three distinctive parts: a latching cycle during which data is accessed and held, a program cycle during which data is entered into memory, and a verify cycle during which the memorized data is checked. The latching pulse, shown to occur during part of the latching cycle in FIG. 6, typically puts the memory device into the program mode for whatever data is thereafter latched, and programming automatically commences as soon as data is latched. Ordinarily the latching time is very short, usually 100–200 nanoseconds, and the programming time is comparatively long, usually about 10 microseconds. In practice, this means that after the data is latched, further input data is not processed into the memory device until the latched data is programmed and verified.

As described in the Reyner application, interleaving is a practice whereby data is latched into a subsequent memory device before the programming is finished for the previous memory device. In this manner, data can be spread among all the memory devices during a very short time, in effect using the relatively long programming time of the flash EPROM memory device as time in which to latch data and start the programming cycle of a series of devices. The benefit is a significant increase in data flow rate into and from the card. The principal disadvantage of spreading consecutive data among all the memory devices stems from the fact that erasure must be performed on each whole memory device (or, in some devices, a substantial portion thereof). For data that is concatenated into a meaningful data set, such as data bytes comprising an image, each set of data defines a block that is desirably treated as a unit for purposes of erasure. If, for example, the memory card 10 has sufficient memory space for fifty images, erasing just one image entails erasing all the memory devices (thus losing the other forty-nine images) because the data for each image is stored in each of the memory devices. In this case the erase block for a single image is said to include the entire memory card.

In some cases, such block erasure can be tolerated because throughput speed is of greater importance. In other cases, such as conventional use with a desktop computer, speed is of less importance, or is dictated by the system interface, and a small erase block is more desirable. The invention deals with these varying requirements by "tuning" the amount of interleaving (and therefore the erase block) to a particular application. Such "tuning" is obtained by having the memory card 10 programmable such that a variable number of memory devices may be independently accessed in a single sequence for one programming cycle, i.e., the degree and amount of interleaving is programmable from the host system 12.

Figure 8:
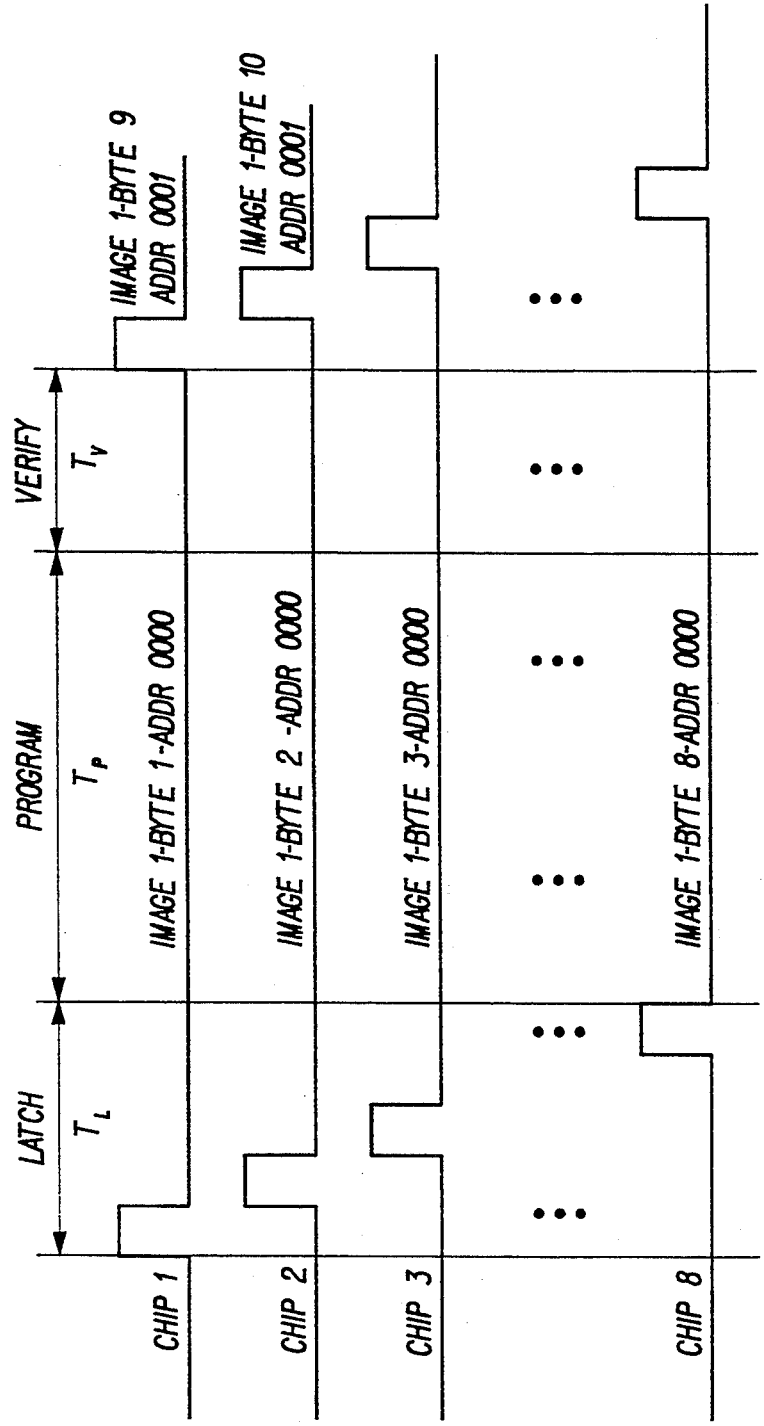
FIG. 8 illustrates the write timing sequence for producing the memory map of FIG. 7.

The number of devices that are independently accessed in a single sequence before programming runs its course is referred to herein as the interleave factor. For example, FIG. 8 shows the timing sequence for an interleave factor of 8. Data is sequentially latched into eight consecutive memory devices while programming is consecutively commenced in each of the devices. Due to the short latching cycle time, programming is thus completed substantially simultaneously for each of the eight devices. It should therefore be apparent that eight pieces of data can be stored in eight separate memory devices in about the time heretofore allotted for storing one piece of data in one memory device. It should thus be appreciated that interleaving has the effect of dispersing the data over every memory device included in the group defined by the interleave factor.

Figure 4A:
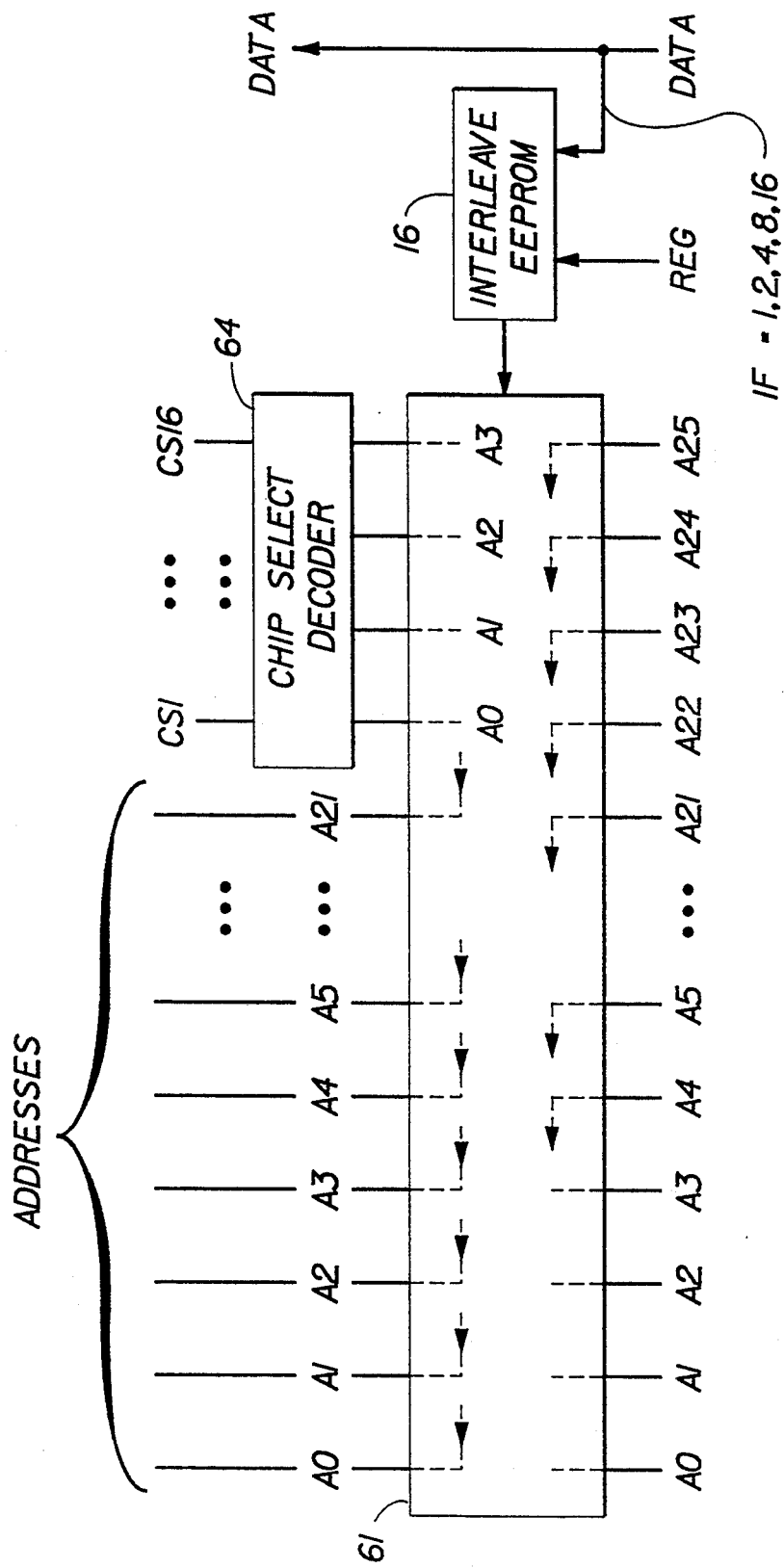
FIGS. 4(A) and 4(B) show two logic embodiments of a programmable circuit for deriving variable interleaving from certain low order address bits provided by the host system.
Figure 4B:
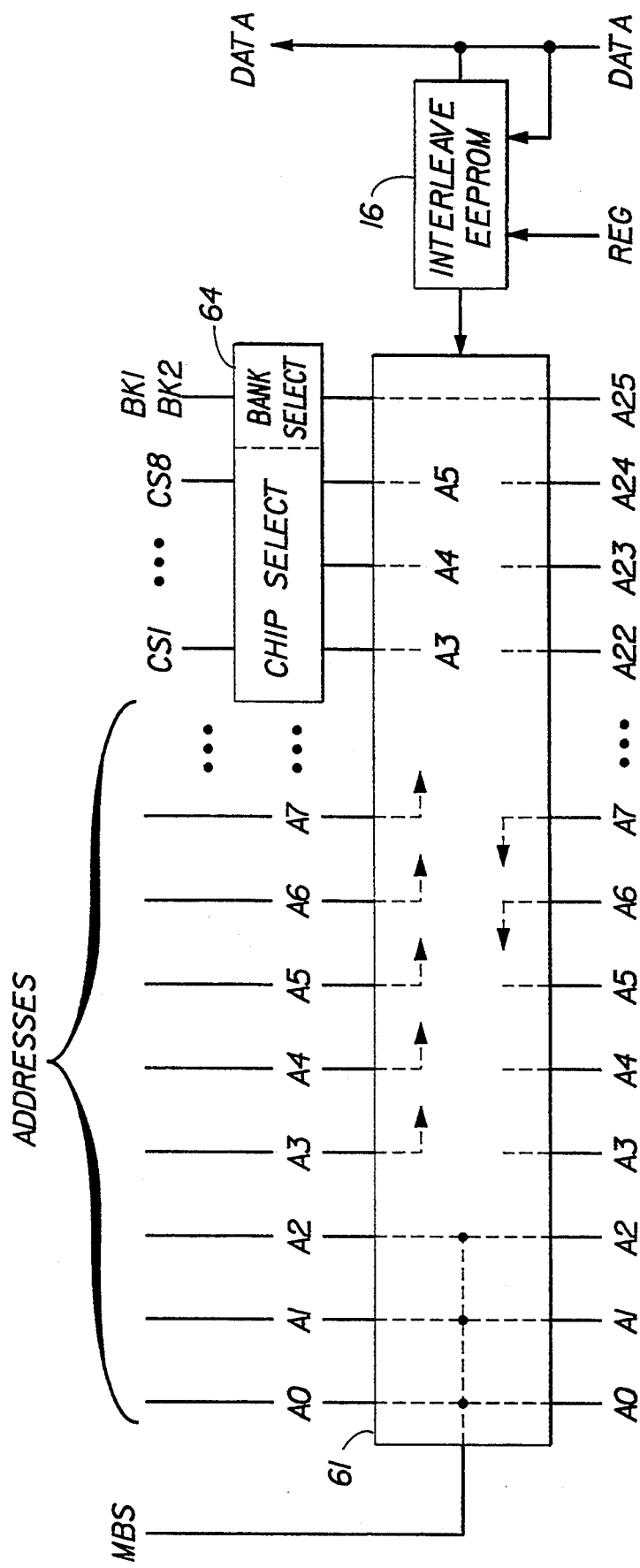

As practiced by the invention in connection with a memory card 10 having sixteen flash EPROM memory devices, the interleave factor, as provided by the host system 12, may be 1, 2, 4, 8, or 16, meaning that the data is dispersed over a like number of memory devices. For that reason, a factor of 1 actually means no interleaving, while a factor of 16 has data distributed over all of the devices in the card 10. The practice of programmable interleaving is accomplished by appropriate inputs into the memory card 10. As shown in FIGS. 3, 4(A) and 4(B), the steering logic 61 is part of the ASIC 14, and has adjustable (programmable) connections for directing a set of low order address bits to the chip select decoder 64. The number of low order bits that are active in chip select (0, 1, 2, 3, or 4 bits) is determined by the interleave factor stored in the memory 16. FIG. 4A, for example, shows the connections in the steering logic 61 for an interleave factor of 16, that is, interleaving throughout the whole card 10. Using low order bits for chip select provides a sequential advance, i.e., interleaving, through the memory devices for consecutive addresses. The number of low order bits determines the number of memory devices in the interleave set that is, how many memory devices are accessed in a programming cycle. The interleave factor is entered as data bits when the attribute memory select (REG) signal is enabled. Besides connecting the low order address bits to the chip select decoder 64, the steering logic 61 in FIG. 4(A) left shifts the remaining address bits so as to left justify with the low order bit A0. How many bits are thus down-shifted depends upon how many low order bits are enabled for chip select. If, for example, the interleave factor is 16, all four address bits A0..A3 are used in chip select and the remaining address bits beginning at A4 left justify to align with the A0 output bit. If the interleave factor is 8, then three bits A0..A2 are used in chip select and the remaining address bits beginning at A3 left justify to the A0 output bit, and so on. In the latter case, that is, with an interleave factor of 8, the sixteen memory devices are divided into two banks of devices (as shown in FIG. 7) and the high order address bit (A25 in FIG. 4(B)) is used in chip select decoding to select between the two banks. Similarly, the two high order address bits A24 and A25 would be used for bank select for an interleave factor of 4 (four banks, as shown in FIG. 14).

In some versions of a memory card 10 a multi-byte select (MBS) factor would also be stored in the EEPROM 16. The MBS factor specifies the number of bytes that can be simultaneously latched into a memory device(s) before programming is commenced (i.e., byte mode and/or word mode). This factor is provided by the memory supplier and stored at the time of card manufacture. Therefore, while the interleave factor is changeable by the end user, the MBS factor is not changeable in the user environment. FIG. 4(B) illustrates the steering logic 16 when an MBS factor is generated to load multiple bytes into each memory device. Certain low order bits, e.g., A0..A2, are used to generate the MBS factor and control addressing of each memory device while the next low order bits, e.g., A3..A5 are steered to the chip select decoder 64.

FIGS. 5 through 15 show different examples of interleave factors, sometimes in combination with the multi-byte feature. "X" (multi-byte write factor) as used in these drawings refers to the number of bytes that a single integrated circuit memory device can write at one time, i.e., one byte at a time for $x=1$ and four bytes at a time for $x=4$. In "byte mode" each integrated circuit memory device latches "x" bytes of data at the same time. In "word mode" two integrated circuit memory devices each latch "x" bytes of data at the same time. FIGS. 5 and 6 depict the resultant memory map of the memory card and the write timing sequence for byte mode with $x=1$ and an interleave factor$=1$ The overall interleave effect is obtained by multiplying the multi-byte write factor (x) times the interleave factor, which remains one in this example. This is the typical memory map for the storage of data files and, except for the capability of changing the interleave factor, this is the write timing sequence practiced in the prior art (i.e., no interleaving). FIGS. 14 and 15 depict the memory map and the write timing sequence for byte mode with $x=1$ and an interleave factor $=4$. Four bytes of data are sequentially latched into memory devices 22-1 through 22-4, using the same address for each device, and the four bytes are programmed and verified. This process is repeated for memory devices 22-1 through 22-4 until the devices are filled with data. Then the same process is repeated for memory devices 22-5 through 22-8, until they are filled, then for devices 22-9 through 22-12, and finally for devices 22-13 through 22-16, until the card is filled. The overall interleave effect provides four times the speed of no interleaving.

FIGS. 7 and 8 depict the memory map and the write timing sequence for byte mode with $x=1$ and an interleave factor$=8$. Eight bytes of data are sequentially latched into memory devices 22-1 through 22-8 (using the same address), the eight bytes are programmed and verified, then eight more bytes are latched for the next address, until the devices 22-1 through 22-8 are filled with data. Then memory devices 22-9 through 22-16 are filled in the same manner. In this example, the overall interleave effect provides an eight-fold speed increase over no interleaving. While not shown, an interleave factor$=16$ (byte mode with $x=1$) would cause the latching, programming, and verifying of sixteen bytes of data through all sixteen memory devices 22-1 to 22-16, for an overall speed advantage of sixteen. In this embodiment, except for the capability of changing the amount of interleaving, an interleave factor of 16 (for a total of 16 devices) corresponds to interleaving as practiced in the prior art.

Figure 10:
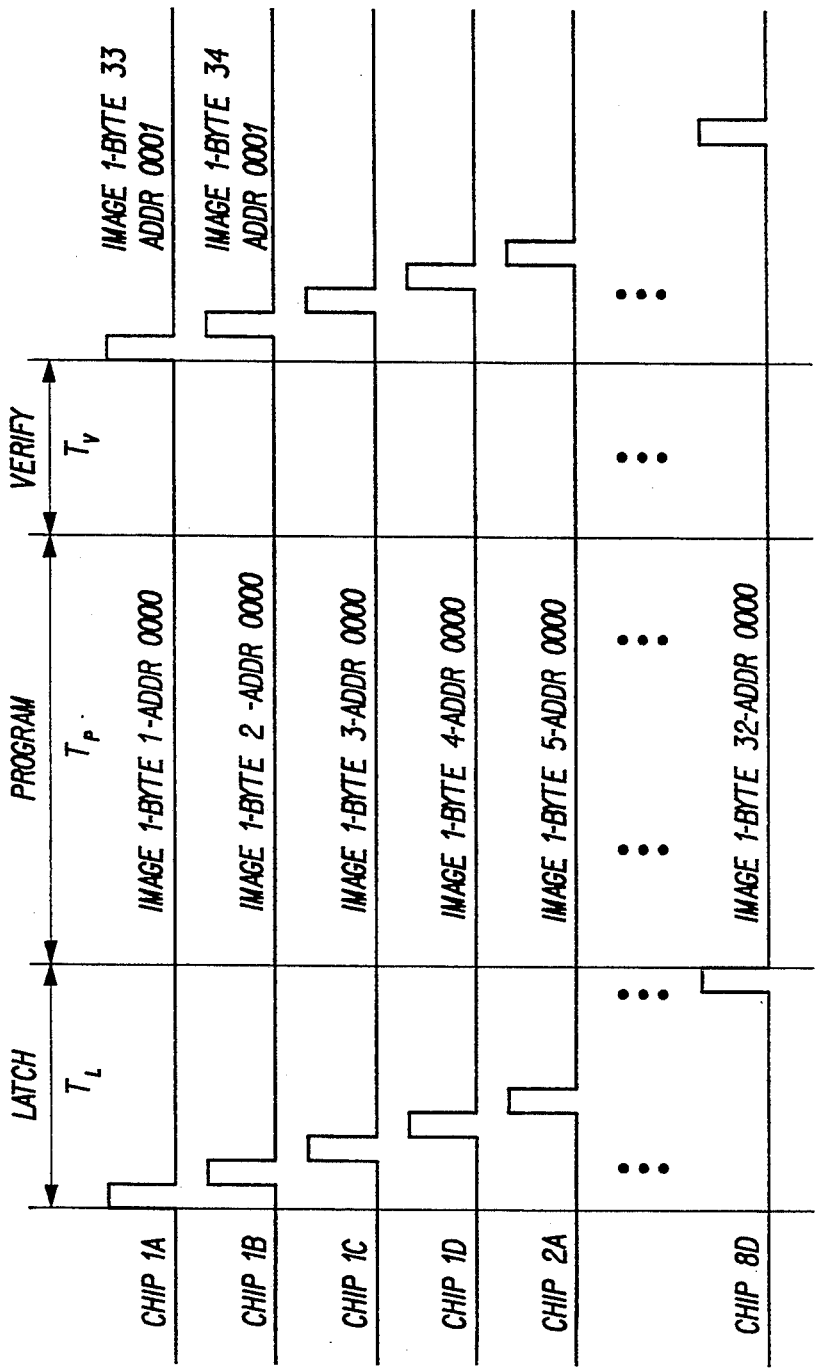
FIG. 10 illustrates the write timing sequence for a first bank of memories in the memory map of FIG. 9.
Figure 11:
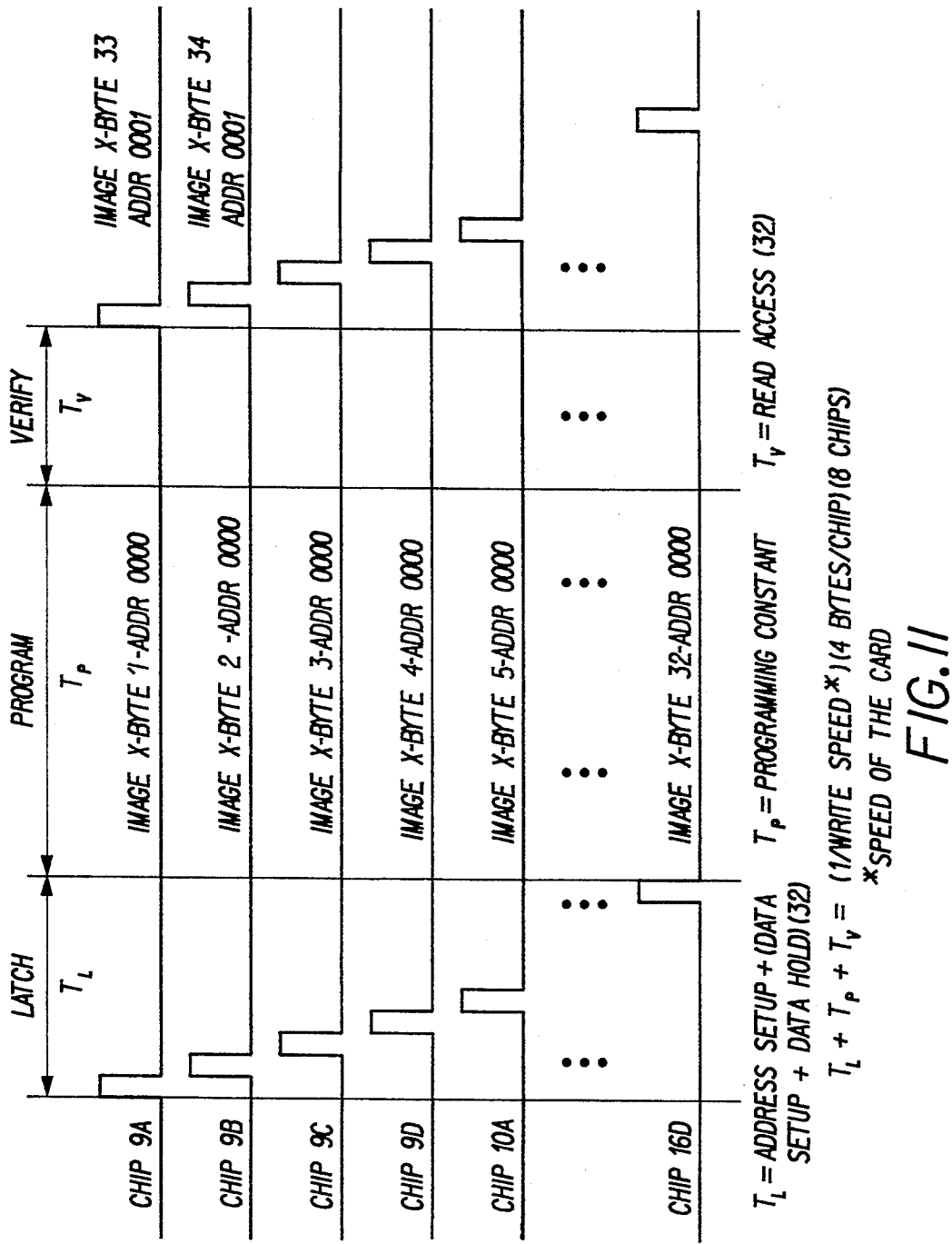
FIG. 11 illustrates the write timing sequence for a second bank of memories in the memory map of FIG. 9.

FIGS. 9, 10, and 11 depict the memory map and the write timing sequence for byte mode with $x=4$ and an interleave factor$=8$. In this implementation, the ASIC circuit 14 generates a multi-byte select signal (MBS) to latch four bytes of data (using the same address) into each memory device 22-1 through 22-8 before advancing to the next memory device. Consequently, thirty-two bytes of data are latched into memory devices 22-1 through 22-8, using the same address for each device, the thirty-two bytes are programmed and verified, then thirty-two bytes are latched for the next address, and so on, until the devices 22-1 through 22-8 are filled with data. Then memory devices 22-9 through 22-16 are filled in the same way. In this example, the overall interleave effect (given the use of multi-byte write devices) is thirty-two times the speed of no interleaving with single-byte write devices. FIGS. 12 and 13 depict the memory map and the write timing sequence for word mode, with $x=4$, and an interleave factor$=8$. In the word mode (for $x=4$), the ASIC circuit 14 generates a multi-byte select (MBS) signal to latch four bytes, using the same address, into each of two memory devices at the same time, e.g., four bytes into memory device 22-1 and another four bytes into memory device 22-9. Consequently, sixty-four bytes of data are latched into memory devices 22-1 through 22-16, using the same address for each device, the sixty-four bytes are programmed and verified, then another sixty-four bytes are programmed and verified for the next address, and so on, until all sixteen devices are filled with data. This implementation provides sixty-four times the speed of no interleaving with single-byte write devices.

While the implementations of FIGS. 7 through 15 are described for use in connection with image data, which due to sheer volume greatly benefits from the increased storage speed, it should be appreciated that the speed advantages are obtained without respect to the type of data. Consequently, no limitations are to be implied because of the image applications. It can be appreciated from the image illustrations, however, that erasing a block of data corresponding to a single application event, such as the taking of an image, can be a problem. For instance, the sixty-four fold increase in speed obtained by the implementation of FIGS. 12 and 13 comes at the expense of dispersing each image across all of the memory devices 22-1 through 22-16. To erase one image, therefore, requires erasing all of the memory devices. In contrast, for a distinctly slower speed advantage of four, each image is dispersed across four memory devices (one of four memory banks) in the implementation of FIGS. 14 and 15. Consequently, erasing one image only entails erasure of one quarter of the memory devices. In this manner, regardless of what the data may represent, the interleave factor, and therefore the memory map, can be tailored to the particular application. However, the images, while shown to be contiguous with a memory bank, may in practice not be evenly divisible into memory banks and at least the final image in each bank may overlap into the succeeding bank.

INDUSTRIAL APPLICABILITY

In practicing the invention, the particular technical advantage is that the interleave factor can be tailored to the write rate requirement of the host system such that the data transfer rate is customized for the particular application. This leads to a more efficient system in which the erase requirements of the application can be more effectively balanced with the data transfer rate.

The invention has been described in detail with particular reference to a presently preferred embodiment, but it will be understood that variations and modifications can be effected within the spirit and scope of the invention.

What is claimed is:

1. Data storage apparatus for use with a host data processing system, said data storage apparatus comprising:
   memory means, divided into a plurality of memory devices, for storing data in addressable data locations;
   memory interleave means, responsive to a control factor input from the host system, for specifying the order by which data locations are addressed among successive memory devices; and
   circuit means responsive to said memory interleave means and to an address input from the host system for accessing data locations among the memory devices according to the order specified by said memory designation means.

2. Apparatus as claimed in claim 1 wherein the control factor input from the host system specifies a selected set of memory devices.

3. Apparatus as claimed in claim 2 wherein the control factor specifies the order in which successive data locations are addressed for each consecutive address input.

4. Apparatus as claimed in claim 3 wherein the order of successive data addresses is among successive memory devices in the selected set so that a stream of data is serially distributed among the memory devices in the selected set.

5. Apparatus as claimed in claim 2 wherein the memory devices are programmable devices to which data is input and held during a first timing cycle and subsequently programmed into storage during a second timing cycle.

6. Apparatus as claimed in claim 5 wherein said circuit means serially enables at least one data location in each memory device in the set during the first timing cycle and then programs each of the accessed data locations during the second timing cycle such that the programming of every device in the set is substantially simultaneous.

7. Apparatus as claimed in claim 6 wherein the host system is an image capture system and wherein the data comprises plural data elements corresponding to elements of an image that are interleaved through the selected set of memory devices.

8. Apparatus as claimed in claim 1 wherein said memory interleave means includes a further memory device for storing the control factor input from the host system.

9. Apparatus as claimed in claim 8 wherein said circuit means includes a chip select decoder and logic for steering a selectable number of low order address bits, as determined by the control factor, to the decoder.

10. A memory card detachably connectable to a host system, said memory card comprising:
    first memory means, divided into a plurality of memory devices, for storing data input from the host system in addressable data locations in the memory devices;
    second memory means, responsive to input from the host system, for storing an interleave factor specifying the order in which data is consecutively distributed among the memory devices; and
    interleave control means, coupled to said second memory means, for distributing data input from the host system among the memory devices in accordance with the stored interleave factor.

11. A memory card as claimed in claim 10 in which the interleave factor further specifies the division of said first memory means into at least one set of memory devices.

12. A memory card as claimed in claim 11 in which said interleave control means distributes data input from the host system in set order such that data is distributed among data locations in the memory devices of a given set before a subsequent set is addressed.

13. A memory card as claimed in claim 12 in which the host system is an electronic camera, and the data comprises plural data elements corresponding to elements of an image, the data elements being interleaved throughout the data elements of each set of memory devices.

14. A memory card as claimed in claim 11 wherein said interleave control means sequentially addresses each memory device in a set for each addressable location.

15. A memory card detachably connectable to a host data processing system, said memory card comprising:
    first memory means for storing data input from the host system, said first memory means divided into a plurality of programmable memory devices each having a latching cycle during which data is presented to the memory device from the host system and a programming cycle during which the latched data is stored in addressable locations in the device;
    second memory means responsive to further input from the host system for storing an interleave factor designating a selected set of memory devices in which the data is serially distributed across the set of memory devices for each consecutive addressable location; and
    means responsive to the interleave factor for serially latching data into identically addressable locations in each memory device in the selected set and enabling the programming cycle for each device in the selected set, whereby programming proceeds in tandem for each device.

16. A memory card as claimed in claim 15 wherein the set size specified by the interleave factor varies from a single memory device to all of the memory devices comprising said first memory means.

17. A memory card as claimed in claim 16 wherein the data input from the host system is divided into data elements that are sequentially distributed among successive memory devices comprising each set.

18. A memory card as claimed in claim 15 wherein the selected set of memory devices designated by the interleave factor is also the erase block size.

19. A memory card as claimed in claim 17 wherein the data element is a byte.

20. A memory card as claimed in claim 17 wherein the data element is a word comprising a plurality of bytes.

21. A memory card as claimed in claim 17 wherein the data elements correspond to elements of an image and said data elements are interleaved through the selected set of memory devices.

* * * * *